United States Patent Office 3,703,518
Patented Nov. 21, 1972

3,703,518
METHOD FOR PRODUCING β-AMINO-
CROTONAMIDE
Takeshi Inoi, Yokohama-shi, Koji Sueyoshi, Minamata-shi, Masahiro Fujii, Kawasaki-shi, Kenjiro Shoji, Yokohama-shi, and Akio Shudo, Takayoshi Yoshizaki, and Yutaka Matsuo, Minamata-shi, Japan, assignors to Chisso Corporation, Osaka, Japan
No Drawing. Filed July 15, 1970, Ser. No. 55,214
Claims priority, application Japan, July 28, 1969, 44/59,502; May 7, 1970, 45/38,828
Int. Cl. C07c 103/00
U.S. Cl. 260—561 N 15 Claims

ABSTRACT OF THE DISCLOSURE

β-Aminocrotonamide having a high purity can be produced with a good yield by a simple process by reacting diketene with ammonia in the presence or in the absence of a specified solvent, cooling the resultant reaction mixture containing an oily reaction product, in the presence of said solvent, uniformly under stirring, followed by a crystallization treatment to precipitate crystals of β-aminocrotonamide and separating and recovering the resultant crystals. The yield is further improved to a quantitative value by introducing the reactants simultaneously into said solvent and further by adopting a molar ratio of one mol of diketene to two or more mols of ammonia in the reaction.

DESCRIPTION OF THE INVENTION

This invention relates to a method for producing β-aminocrotonamide, and more particularly it relates to an improvement in a method for producing β-aminocrotonamide by reacting diketene with ammonia.

A method for preparing β-aminocrotonamide has been reported by F. Chick et al. which comprises introducing dry ammonia into diketene in ether under cooling with ice to precipitate white crystals of acetoacetamide, and further continuing the introduction of ammonia to allow the crystals to disappear, whereby β-aminocrotonamide of a yellow oily substance is obtained. [F. Chick, N, Wilsmore, J.C.S. 97, 1978–2000 (1910)]. It is described in the report that β-aminocrotonamide is obtained as an inseparable yellow oily substance. Further, a method for recovering β-aminocrotonamide has recently been known which comprises dehydrating by-produced water followed by solvent-extraction. (Japanese patent publication No. 2686/1968). This method has enabled to recover β-aminocrotonamide from the yellow oily substance. The method, however, has a number of drawbacks such that β-aminocrotonamide cannot be obtained unless white crystals of acetoacetamide are once precipitated, which causes the attachment of the acetoacetamide crystals on the inner wall surface of the reactor and reduces heat transfer remarkably, and also a yellow by-product is liable to be formed, which lowers the yield.

Thus, the above-mentioned method cannot be deemed as a commercially feasible one.

After strenuous studies relative to the reaction of diketene with ammonia and operational conditions thereof, the present inventors have found that the presence of by-produced water makes very difficult the separation and recovery of β-aminocrotonamide from the reaction system.

Further, the present inventors have found that if the reaction mixture is carried out under a condition that diketene in the mixture is not in excess of ammonia during the reaction, the usual phenomenon of crystals of acetoacetamide being precipitated, does not occur.

An object of the present invention is to provide a method for producing β-aminocrotonamide which is capable of achieving the separation of by-produced water and β-aminocrotonamide to thereby obtain β-aminocrotonamide having a high purity and quality by a simple operation and with a high yield.

The present inventors have found that such an object can be attained by cooling not merely an oily reaction product, but the whole of the reaction mixture after the reaction containing said oily reaction product, in the presence of a specified solvent, uniformly under stirring, and this is most important and advantageous for the separation of by-produced water and thus the recovery of crystals of β-aminocrotonamide having a high purity and quality with a good yield.

Another object of the present invention is to provide a method for producing β-aminocrotonamide which is capable of further improving the yield. The present inventors have found that such an object can be attained by establishing pertinent reaction conditions hereinafter explained.

Other object of the present invention will be apparent from the following descriptions.

The present invention consists in (1) a method for producing β-aminocrotonamide which comprises reacting diketene with ammonia in the presence or in the absence of a solvent having a melting point below 0° C. and selected from the group consisting of (a) aliphatic or cycloaliphatic hydrocarbons having 5–8 carbon atoms,
(b) aromatic hydrocarbons having one or more alkyls and having 7–12 carbon atoms,
(c) chlorinated hydrocarbons having 1–10 carbon atoms,
(d) aliphatic monoethers having 4–8 carbon atoms, and
(e) ketones having 3–10 carbon atoms, cooling the resultant reaction mixture containing an oily reaction product, in the presence of said solvent, uniformly under stirring, followed by a crystallization treatment to precipitate crystals of β-aminocrotonamide and separating and recovering the resultant crystals.

The present invention is further characterized (2) by reacting diketene with ammonia while introducing them simultaneously into said solvent in a molar ratio of one mol of diketene to two or more mols of ammonia.

The reaction of diketene with ammonia is carried out preferably in a state capable of removing the reaction heat, for example, under cooling with ice, and the raw materials and solvent to be used are preferred to be those as dehydrated as possible. It is necessary that the solvents to be used are those which are inert to any of diketene, ammonia and the reaction product under the conditions of the present invention and do not dissolve or hardly dissolves β-aminocrotonamide in cold state.

The solvents having such properties and suitable for the invention can be selected from the group consisting of (a) aliphatic or cycloaliphatic hydrocarbons having 5–8 carbon atoms,
(b) aromatic hydrocarbons having one or more alkyls and having 7–12 carbon atoms, (c) chlorinated hydrocarbons having 1–10 carbon atoms,
(d) aliphatic monoethers having 4–8 carbon atoms, and
(e) ketones having 3–10 carbon atoms.

These solvents also should have a melting point below 0° C., since those having a melting point above 0° C. obstruct subsequent crystallization of β-aminocrotonamide.

As such solvents, there are illustrated saturated aliphatic hydrocarbons such as pentane, hexane, heptane, octane or the like, aromatic hydrocarbons such as toluene, xylene, ethylbenzene, pseudocumene or the like, chlorinated hydrocarbons such as trichloroethane, dichloroethylene, carbon tetrachloride, monochlorobenzene or the like, cycloaliphatic hydrocarbons such as cyclohexane or the like, ethers such as diethyl ether, dipropyl ether, ethyl propyl ether, dibutyl ether or the like, ketones such as acetone, methyl ethyl ketone, diisobutyl ketone or the like. These solvents include those having a mutual solubility with water and those having a low mutual solubility with water. The use of the latter solvents such as toluene is particularly advantageous, because they can be recycled and reused without any purification.

The reaction of the previously-mentioned method (2) can be carried out at a temperature of 40° C. or less, preferably 30° C. or less, and also in a molar ratio at the time of simultaneous change of diketene (dropwise) and ammonia (blown) of one mol of diketene per two or more mols of ammonia. The introducing velocity has no particular limitation if it is within a range capable of removing the reaction heat.

Further, for the reaction part of the above-mentioned method (1) consisting of reaction and after treatment, it is most preferable to adopt the above-mentioned method (2) but an usual, reaction method other than the method (2) can be also carried out. In such a case, diketene or a mixture of diketene and a specified solvent of the present invention, is reacted with ammonia. The reaction temperature and the feeding velocity of ammonia are the same as those in the previously-mentioned method (2).

Thus, yellow, oily β-aminocrotonamide can be obtained from diketene and ammonia. Particularly when the method (2) is employed, white crystals of acetoacetamide do not precipitate on the inner wall surface of the reactor during the reaction, and hence the heat transfer of the reactor's wall becomes remarkably better and the reaction time can be shortened. In the method (1) and the simultaneous use of the methods (1) and (2), not only a batch-wise reaction but also a continuous one can be carried out. Further, due to the absence of excessive (unreacted) diketene during the reaction, the formation of a yellow by-product is inhibited, and as seen in examples, β-aminocrotonamide having a remarkably higher purity can be obtained in a much better yield compared with those of the conventional methods. Also, in the method (1), if the reaction of diketene and ammonia is carried out in the absence of solvent, the above-mentioned specified solvent is added to the reaction system after the reaction and the whole of the resultant reaction mixture is cooled uniformly under stirring to below room temperature preferably to 0–10° C. Although the crystals of β-aminocrotonamide can be precipitated merely by cooling in some case, a crystallization treatment such as adding nuclei of the crystals to the resultant liquid under cooling, or giving a mechanical impetus thereto, for example, by rubbing the inner wall surface of the vessel containing the liquid, is further added in the method (1) of the present invention, whereby the separation of by-produced water becomes easy and the crystals of β-aminocrotonamide can be precipitated easily. Thus, the crystals of β-aminocrotonamide can be readily separated and recovered from the formation system without suffering any influence of by-produced water. After the above-mentioned crystallization treatment, the resultant crystals are then subjected to an usual, physical separation operation such as filtration under atmospheric pressure, filtration under a pressure, filtration under a reduced pressure, or centrifugal separation for recovering. Among these separation methods, centrifugal separation is particularly preferable in commercial plant operation. Unreacted, excessive ammonia existent in the product can be fully removed during the crystallization process of β-aminocrotonamide and also during the above-mentioned separation operation, and hence an additional operation of removal is not necessary.

Whereas, it has been necessary in the previously mentioned method of Japanese patent publication No. 2685/1968 to add anhydrous potassium carbonate or anhydrous sodium carbonate as an agent for dehydrating by-produced water to a yellow, oily product which is the reaction product or diketene and ammonia, and from which the crystals of β-aminocrotonamide are hardly separable, and thereafter to extract β-aminocrotonamide with chloroform.

According to the method (1) of the present invention, such a treatment with a dehydrating agent followed by a solvent extraction, is not necessary, and hence the method (1) enables not only to separate the crystals of β-aminocrotonamide much economically, but also to attain a nearly quantitative yield by the simultaneous employment of the method (2) of the present invention.

β-aminocrotonamide thus prepared is useful as an intermediate for producing compounds having applications as a stabilizer for polyvinyl compounds, agricultural medicines and others.

The following non-limiting examples are given to illustrate the invention.

EXAMPLE 1

42 g. of diketene was added to 120 ml. of toluene, and dry ammonia was then introduced into the resultant solution under cooling. White crystals precipitated at first, but upon further continuing the introduction, the reaction product became oily and formed two phases. These two phases were cooled to about 3° C. and maintained at such temperature. While mixing such cooled two phases uniformly under stirring, small pieces of crystalline β-aminocrotonamide were added thereto to cause crystallization of β-aminocrotonamide and at the same time to release excessive ammonia existent therein.

After the crystallization, the product was separated by a centrifuge to give 46 g. of crystals of β-aminocrotonamide (yield 92%, M.P. 100–101° C.).

*Elementary analysis.*—Calcd. for $C_4H_8ON_2$ (percent): C, 48.0; H, 8.1; N, 28.0. Found (percent): C, 47.8; H, 8.0; N, 28.1.

EXAMPLE 2

Diketene was reacted with ammonia in the same way as in Example 1 except that 21 g. of diketene was substituted for 42 g. thereof and 60 ml. of trichloroethylene was substituted for 120 ml. of toluene. After the reaction, the resultant system was cooled uniformly under stirring. Crystals of β-aminocrotonamide were precipitated by rubbing the inner wall surface of the reaction vessel with a glass rod. After the precipitation, the reaction product was separated by a centrifuge to give 24.2 g. of crystals of β-aminocrotonamide (yield 96.8%, M.P. 99–100° C.).

*Elementary analysis.*—Found (percent): C, 47.9; H, 8.4; N, 28.4.

EXAMPLE 3

The reaction of diketene with ammonia, cooling and crystallization were carried out in the same way as in Example 1 except that 21 g. of diketene was substituted for 42 g. thereof and 50 ml. of n-hexane was substituted for 120 ml. of toluene. The reaction product after the crystallization was filtered by aspiration, and crystals thus obtained were dried under a reduced pressure overnight to give 23.5 g. of crystals of β-aminocrotonamide (yield 94%, M.P. 100–101° C.).

EXAMPLE 4

Dry ammonia was carefully and slowly introduced into 42 g. of diketene under cooling. The resultant reaction product solidified in white crystals, and upon further continuing the introduction of ammonia, the product became oily. The product was then cooled. 120 ml. of cooled dipropyl ether was mixed with the cooled product uniformly under stirring. After allowed to stand, the mixture separated into two phases. Such two phases of an oily product and dipropyl ether in the apparatus were mixed uniformly under stirring and were cooled to about 3° C. and maintained at such temperature. Small pieces of crystals of β-aminocrotonamide were added to the oily product to cause crystallization of β-aminocrotonamide and at the same time to release excessive ammonia existent therein.

After the crystallization, the product was separated by a centrifuge to give 45 g. of crystals of β-aminocrotonamide (yield 90%, M.P. 99–100° C.).

*Elementary analysis.*—C, 47.8; H, 8.4; N, 28.3.

EXAMPLE 5

Dry ammonia was carefully and slowly introduced into 42 g. of diketene under cooling.

In the step that the resultant reaction product solidified in white crystals, the introduction of ammonia was once stopped and 120 ml. of cooled toluene was added thereto to disperse the solid product under stirring. Thereafter, ammonia was again introduced until the white crystals were dissolved and separated in an oily substance. The reaction product was cooled to 3° C. while mixing the resultant reaction system uniformly under stirring. Two glass rods were rubbed together with each other in the content of the reaction vessel to precipitate crystals of β-aminocrotonamide.

The reaction product after the crystallization was separated by a centrifuge to give 45.5 g. of crystals of β-aminocrotonamide (yield 91%, M.P. 100–101° C).

EXAMPLE 6

Diketene was reacted with ammonia while dropping 84 g. of diketene (purity 99.5%) and blowing 54 g. of ammonia simultaneously into 200 g. of toluene in a molar ratio of about 1:3.

During the reaction, the reaction system was maintained at 20±5° C. by cooling with ice and uniformly under stirring. A yellow, oily product was formed simultaneously with the start of dropping of diketene. Upon stopping the stirring, two layers were formed. The reaction was completed in about 90 minutes.

After completion of the reaction, the product was treated in the same way as in Example 1 to give 99.0 g. of crystals of β-aminocrotonamide (yield 99%, M.P. 100–101° C.).

COMPARATIVE EXAMPLE 1

84 g. of diketene was fed into 200 g. of toluene at a time, and 54 g. of ammonia was then introduced into the resultant solution in the same way as in Example 6. White crystals precipitated on the way, while the temperature of the reaction system rose up to 35° C., and hence the introduction of ammonia was discontinued for a short time, but finally a yellow, oily product was obtained. The time necessary for the reaction was 210 minutes. Thereafter, the same treatment as in Example 6 was carried out to give 93.0 g. of crystals of β-aminocrotonamide (yield 93%, M.P. 99–100° C.).

EXAMPLE 7

The same reaction and subsequent treatment as in Example 6 were carried out except that diketene having a purity of 98.3% and 42.5 g. of ammonia were used (molar ratio of diketene and ammonia:1/2.5) to give 96.5 g. of crystals of β-aminocrotonamide (yield 96..5%, M.P. 100–101° C.). The reaction was completed in about 80 minutes.

COMPARATIVE EXAMPLE 2

The Example 7 was repeated except that diketene was fed together with solvent at a time in the beginning of the reaction. 88.5 g. of crystals of β-aminocrotonamide (yield 88.5%, 98–99° C.) was obtained. On the way of the reaction, white crystals of acetacetamide precipitated, and 220 minutes was necessary for the completion of the reaction.

What is claimed is:

1. A method for producing β-aminocrotonamide which comprises reacting diketenes with ammonia, cooling the resultant recation mixture containing an oily reaction product, in the presence of a solvent having a melting point below 0° C. and selected from the group consisting of (a) aliphatic or cycloaliphatic hydrocarbons having 5–8 carbon atoms,
   (b) aromatic hydrocarbons having one or more alkyls and having 7–12 carbon atoms,
   (c) chlorinated hydrocarbons having 1–10 carbon atoms,
   (d) aliphatic monoethers having 4–8 carbon atoms, and
   (e) ketones having 3–10 carbon atoms, uniformly under stirring, followed by a crystallization treatment to precipitate crystals of β-aminocrotonamide and separating and recovering the resultant crystals.

2. A method for producing β-aminocrotonamide which comprises reacting diketene with ammonia in the presence of a solvent having a melting point below 0° C. and selected from the group consisting of (a) aliphatic or cycloaliphatic hydrocarbons having 5–8 carbon atoms,
   (b) aromatic hydrocarbons having one or more alkyls and having 7–12 carbon atoms,
   (c) chlorinated hydrocarbons having 1–10 carbon atoms,
   (d) aliphatic monoethers having 4–8 carbon atoms, and
   (e) ketones having 3–10 carbon atoms, cooling the resultant reaction mixture containing an oily reaction product, in the presence of said solvent, uniformly under stirring, followed by a crystallization treatment to precipitate crystals of β-aminocrotonamide and separating and recovering the resultant crystals.

3. A method for producing β-aminocrotoamide according to claim 2, wherein the reaction of diketene and ammonia is carried out while introducing them simultaneously into said solvent in a molar ratio of one mol of diketene to two or more mols of ammonia.

4. A method for producing β-aminocrotonamide according to claim 1 wherein said crystallization treatment is carried out by adding seed of β-aminocrotonamide to the cooled and uniformly stirred reaction mixture containing said solvent, or by giving a mechanical impetus to things contacting with the reaction mixture in this reaction mixture.

5. A method for producing β-aminocrotonamide according to claim 1 wherein the reaction is carried out at a temperature of 40° C. or lower.

6. A method for producing β-aminocrotonamide according to claim 2 wherein said crystallization treatment is carried out by adding seed of β-aminocrotonamide to the cooled and uniformly stirred reaction mixture containing said solvent, or by giving a mechanical impetus to things contacting with the reaction mixture in this reaction mixture.

7. A method for producing β-aminocrotonamide according to claim 2 wherein the reaction is carried out at a temperature of 40° C. or lower.

8. The method of claim 1 wherein said solvent is an aliphatic or cycloaliphatic hydrocarbon having 5–8 carbon atoms.

9. The method of claim 1 wherein said solvent is an aromatic hydrocarbon having 1 or more alkyls and having 7–12 carbon atoms.

10. The method of claim 1 wherein said solvent is a chlorinated hydrocarbon having 1–10 carbon atoms.

11. The method of claim 1 wherein said solvent is a ketone having 3–10 carbon atoms.

12. The method of claim 1 wherein the resultant reaction mixture is cooled to below room temperature in the presence of said solvent uniformly under stirring.

13. The process of claim 1 wherein the resultant reaction mixture is cooled to a temperature of 0 to 10° C. in the presence of said solvent uniformly under stirring.

14. The method of claim 2 wherein the resultant reaction mixture is cooled to below room temperature in the presence of said solvent uniformly under stirring.

15. The process of claim 2 wherein the resultant reaction mixture is cooled to a temperature of 0 to about 10° C. in the presence of said solvent uniformly under stirring.

References Cited

Chem. Abstracts, vol. 69, 1968, 105938q.

LEWIS GOTTS, Primary Examiner

E. G. LOVE, Assistant Examiner